(12) United States Patent
Yagisawa

(10) Patent No.: US 11,743,576 B2
(45) Date of Patent: Aug. 29, 2023

(54) IMAGE PROCESSING APPARATUS, IMAGE PROCESSING METHOD, PROGRAM, AND IMAGING APPARATUS

(71) Applicant: SONY GROUP CORPORATION, Tokyo (JP)

(72) Inventor: Hitoshi Yagisawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 6 days.

(21) Appl. No.: 17/441,133

(22) PCT Filed: Jan. 7, 2020

(86) PCT No.: PCT/JP2020/000146
§ 371 (c)(1),
(2) Date: Sep. 20, 2021

(87) PCT Pub. No.: WO2020/202684
PCT Pub. Date: Oct. 8, 2020

(65) Prior Publication Data
US 2022/0159192 A1    May 19, 2022

(30) Foreign Application Priority Data

Mar. 29, 2019  (JP) .............................. JP2019-066235

(51) Int. Cl.
*H04N 23/63*    (2023.01)
*G06T 5/50*    (2006.01)
(Continued)

(52) U.S. Cl.
CPC ............. *H04N 23/632* (2023.01); *G06T 5/50* (2013.01); *H04N 5/272* (2013.01);
(Continued)

(58) Field of Classification Search
None
See application file for complete search history.

(56) References Cited

U.S. PATENT DOCUMENTS

2005/0190989 A1* 9/2005 Kondo ............... G02B 27/0093
382/293
2009/0284637 A1* 11/2009 Parulski ............. H04N 5/23222
348/E5.022
(Continued)

FOREIGN PATENT DOCUMENTS

CN    102348059 A    2/2012
CN    103416051 A    11/2013
(Continued)

OTHER PUBLICATIONS

International Search Report and Written Opinion of PCT Application No. PCT/JP2020/000146, dated Mar. 3, 2020, 09 pages of ISRWO.

*Primary Examiner* — James M Hannett
(74) *Attorney, Agent, or Firm* — Chip Law Group

(57) ABSTRACT

A control section 35 compares angles of view of a main captured image generated by a main imaging section 21 and a subordinate captured image generated by a subordinate imaging section 22. In a case where a result of comparison, by the control section 35, of the angles of view indicates that the angle of view of the main captured image is narrower than the angle of view of the subordinate captured image, an image synthesis section 24 generates a display image by superimposing the main captured image on the subordinate captured image or superimposing the reduced subordinate captured image on the main captured image. In a case where the angle of view of the main captured image is narrower than the angle of view of the subordinate image, the main captured image is set as the display image. It is possible to easily decide a composition during shooting by using the (Continued)

subordinate captured image. It is also possible to confirm an imaging status by using the main captured image.

21 Claims, 10 Drawing Sheets

(51) Int. Cl.
    *H04N 5/272*     (2006.01)
    *H04N 23/69*     (2023.01)
    *H04N 23/90*     (2023.01)
    *H04N 23/53*     (2023.01)
    *H04N 23/951*     (2023.01)

(52) U.S. Cl.
    CPC ........... *H04N 23/531* (2023.01); *H04N 23/69* (2023.01); *H04N 23/90* (2023.01); *H04N 23/951* (2023.01); *G06T 2200/24* (2013.01); *G06T 2207/20221* (2013.01)

(56) References Cited

U.S. PATENT DOCUMENTS

| | | |
|---|---|---|
| 2012/0026364 A1 | 2/2012 | Kuma |
| 2014/0002709 A1 | 1/2014 | Sakurabu |
| 2015/0181120 A1 | 6/2015 | Tsuchida et al. |
| 2019/0089908 A1* | 3/2019 | Matsunaga ...... H04N 5/232127 |
| 2019/0289201 A1 | 9/2019 | Nishimura et al. |

FOREIGN PATENT DOCUMENTS

| | | |
|---|---|---|
| CN | 109155815 A | 1/2019 |
| JP | 2012-029245 A | 2/2012 |
| JP | 2012-042805 A | 3/2012 |
| JP | 2013-235195 A | 11/2013 |
| JP | 2015-136096 A | 7/2015 |
| WO | 2012/120952 A1 | 9/2012 |
| WO | 2017/200049 A1 | 11/2017 |

* cited by examiner

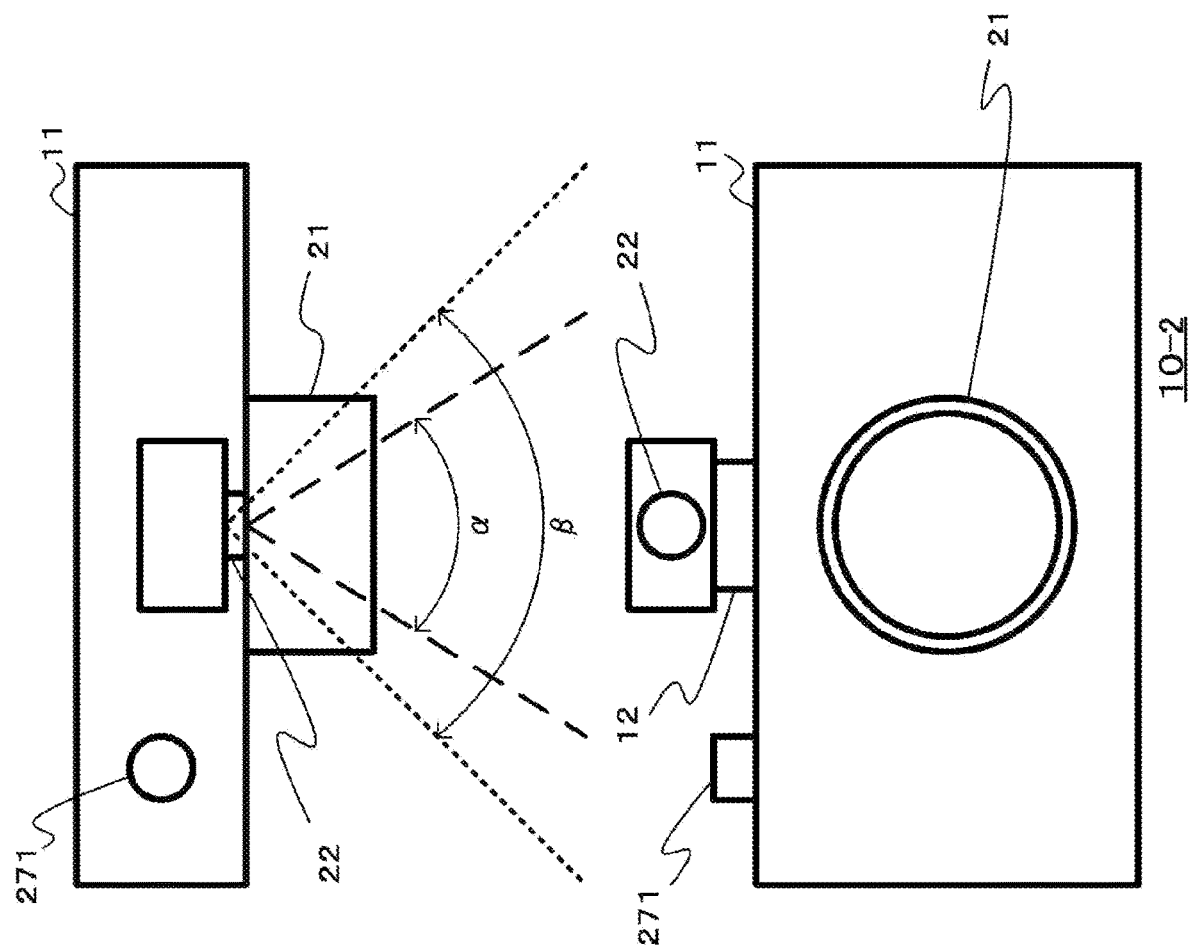

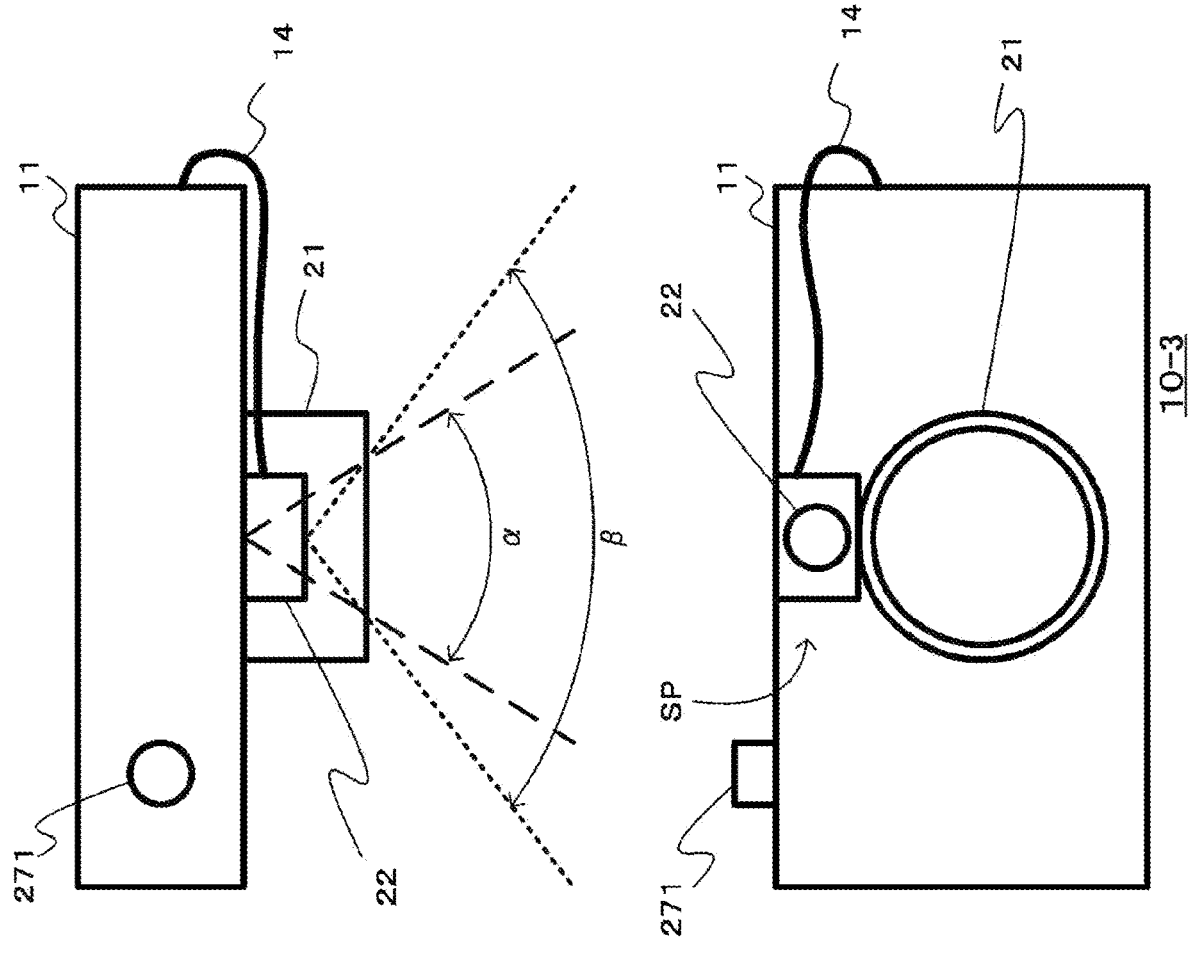

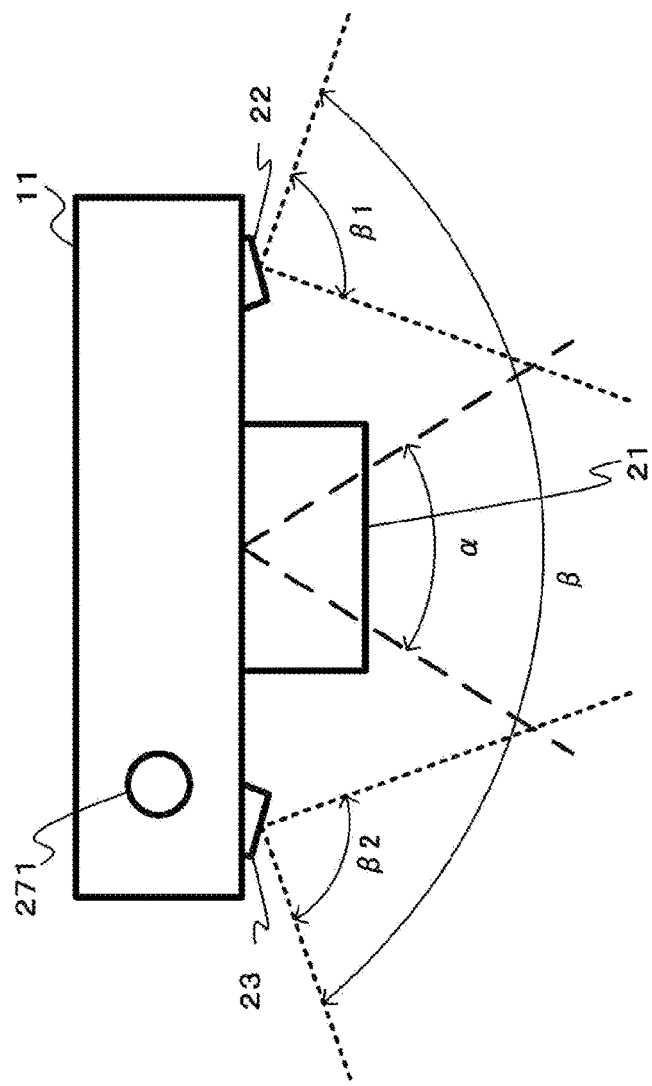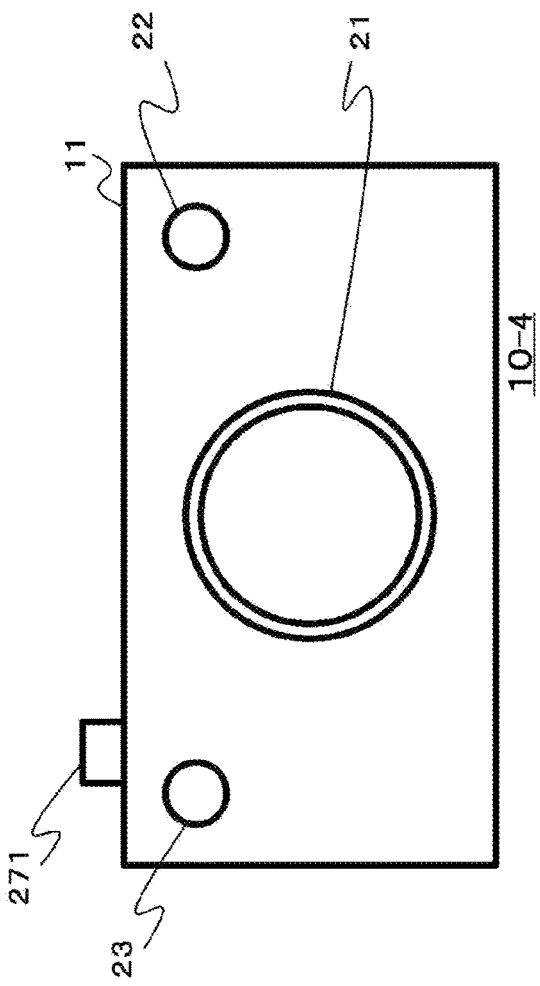
FIG. 4B
FIG. 4A

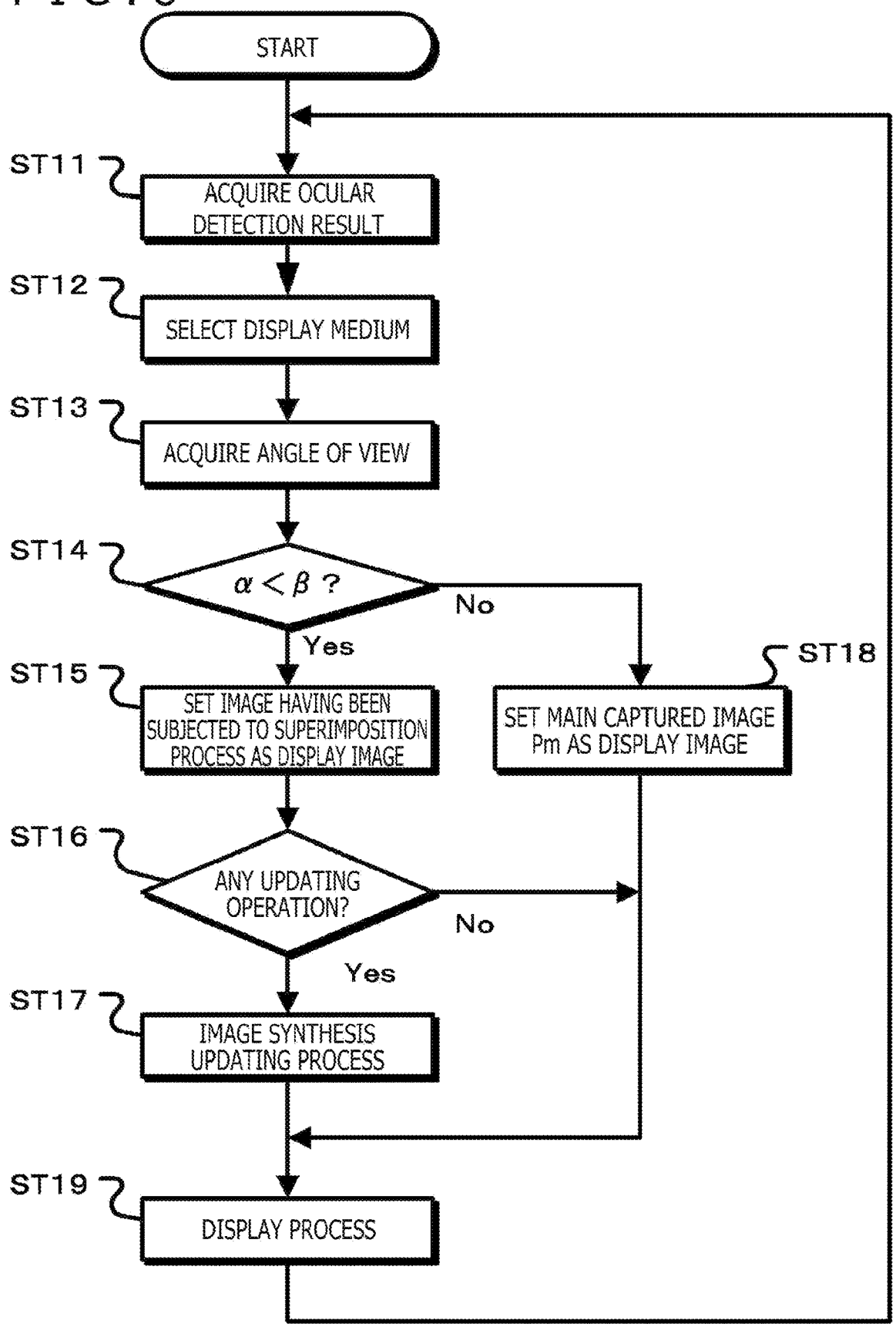

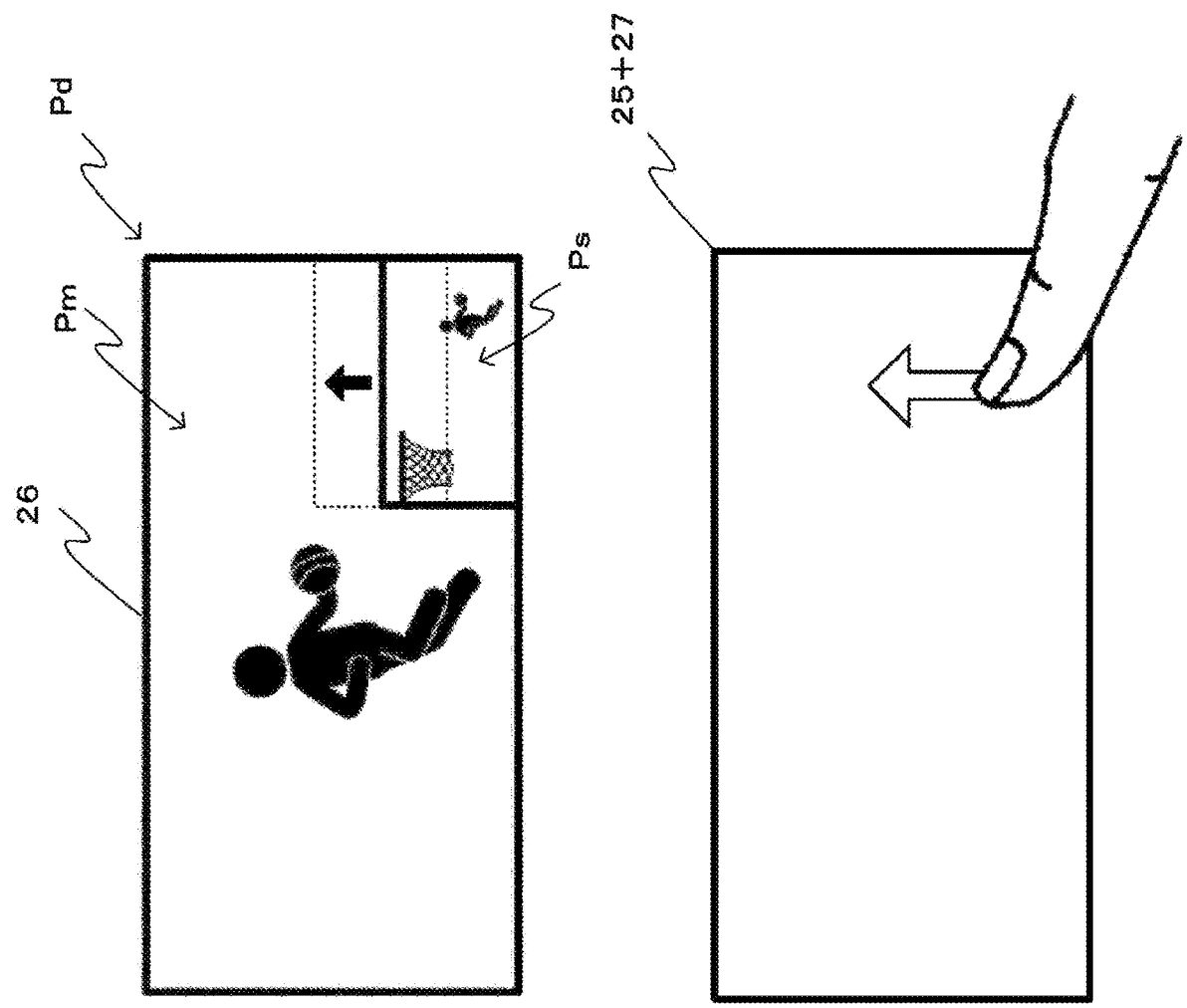

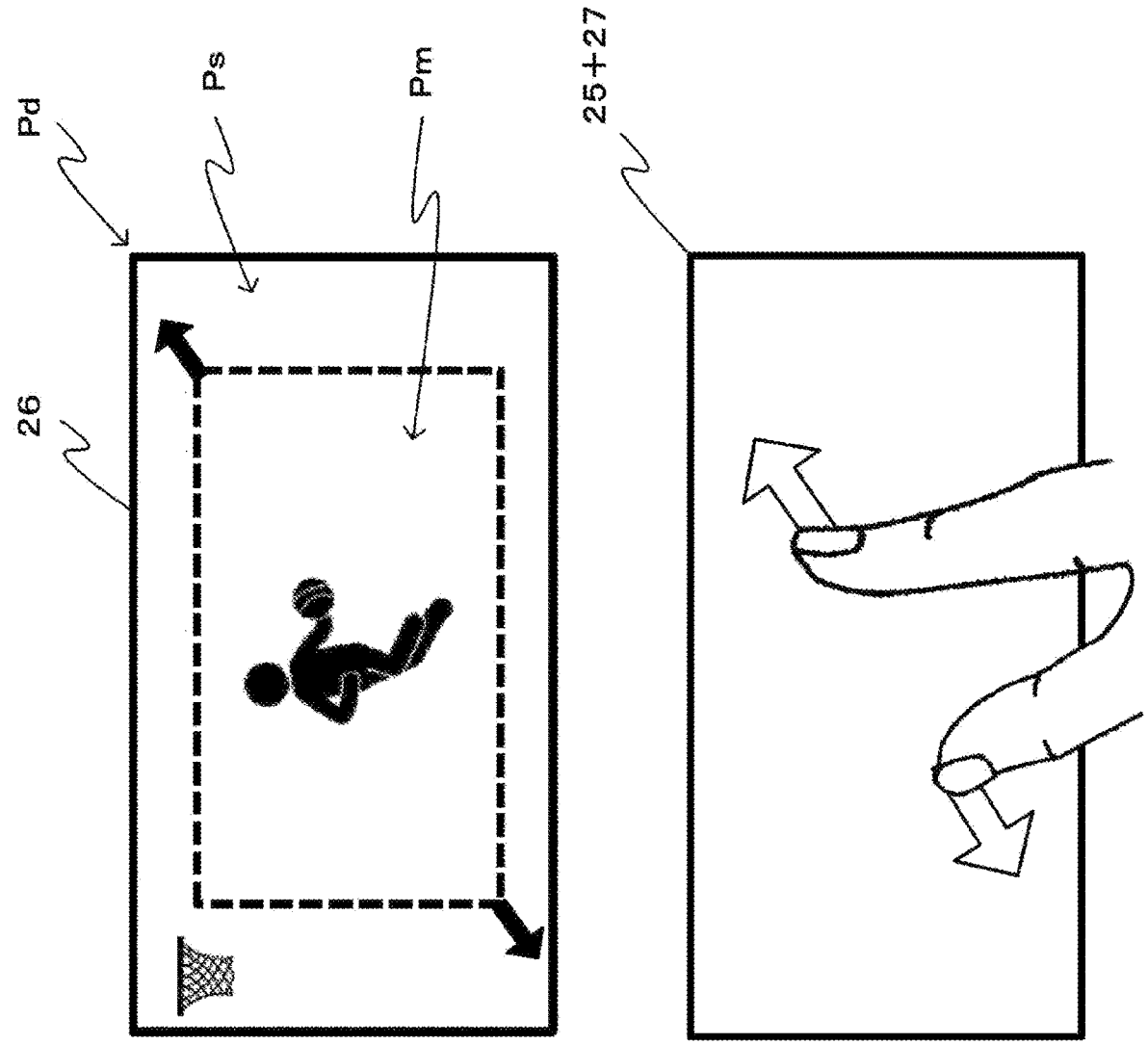

IMAGE PROCESSING APPARATUS, IMAGE PROCESSING METHOD, PROGRAM, AND IMAGING APPARATUS

CROSS REFERENCE TO RELATED APPLICATIONS

This application is a U.S. National Phase of International Patent Application No. PCT/JP2020/000146 filed on Jan. 7, 2020, which claims priority benefit of Japanese Patent Application No. JP 2019-066235 filed in the Japan Patent Office on Mar. 29, 2019. Each of the above-referenced applications is hereby incorporated herein by reference in its entirety.

TECHNICAL FIELD

The present technology relates to an image processing apparatus, an image processing method, a program, and an imaging apparatus and allows an easy setting of a composition and confirmation of an imaging status.

BACKGROUND ART

It has been difficult in some cases to look for a subject once the subject is missed while a composition is confirmed due to narrowing of an angle of view during shooting when telephoto shooting is performed with an imaging apparatus. In order to solve this problem, in PTL 1, for example, a first image generated by a camera body using a body lens and a second image generated by an attachment fitted to the camera body using an attachment lens having a different angle of view from the body lens are used, thus allowing a shooting range frame of the image with the narrower shooting range to be superimposed on the image with the wider shooting range.

CITATION LIST

Patent Literature

[PTL 1]
Japanese Patent Laid-Open No. 2013-235195

SUMMARY

Technical Problem

Incidentally, although the shooting range of the camera body becomes clear in PTL 1, it is impossible to confirm the image generated by the camera body.

In light of the foregoing, it is an object of the present technology to provide an image processing apparatus, an image processing method, a program, and an imaging apparatus that allow not only an easy setting of a composition during shooting but also easy confirmation of an imaging status.

Solution to Problem

A first aspect of the present technology is an image processing apparatus that includes an image synthesis section adapted to generate a display image by performing, according to a result of comparison of angles of view of a main captured image generated by a main imaging section and a subordinate captured image generated by a subordinate imaging section, an image synthesis process with use of the main captured image and the subordinate captured image, and a control section adapted to cause the image synthesis section to perform the image synthesis process in response to detection of an action of visually recognizing the display image generated by the image synthesis section.

In the present technology, the control section compares the angles of view of the main captured image and the subordinate captured image on the basis of angle-of-view information indicating the angle of view of the main captured image generated by the main imaging section and the angle of view of the subordinate captured image generated by the subordinate imaging section whose imaging direction corresponds to an imaging direction of the main imaging section. The image synthesis section generates the display image by performing, according to a result of comparison of the angles of view, the image synthesis process with use of the main captured image and the subordinate captured image. For example, in a case where the angle of view of the main captured image is narrower than the angle of view of the subordinate captured image, the display image is generated by superimposing the main captured image on the subordinate captured image or by superimposing the reduced subordinate captured image on the main captured image. Also, in the case where the angle of view of the main captured image is narrower than the angle of view of the subordinate captured image, the main captured image is used as the display image. Also, the control section controls the image synthesis section to perform the image synthesis process in response to the detection of the action of visually recognizing the display image generated by the image synthesis section.

The angle of view of the main imaging section for generating the main captured image or the subordinate imaging section for generating the subordinate captured image can be changed, and in a case where the main imaging section or the subordinate imaging section performs a zooming action, a result of comparison of the angles of view of the main captured image and the subordinate captured image is output to the image synthesis section.

Also, in a case where a user interface section is provided to accept a user operation and the display image is generated by superimposing the main captured image on the subordinate captured image, a superimposition size or a superimposition position of the main captured image is changed in response to the user operation accepted by the user interface section.

A second aspect of the present technology is an image processing method that includes generating, by an image synthesis section, a display image by performing, according to a result of comparison of angles of view of a main captured image generated by a main imaging section and a subordinate captured image generated by a subordinate imaging section, an image synthesis process with use of the main captured image and the subordinate captured image, and causing, by a control section, the image synthesis section to perform the image synthesis process in response to detection of an action of visually recognizing the display image generated by the image synthesis section.

A third aspect of the present technology is a program causing a computer to generate a display image, the program causing the computer to perform a step of generating the display image by performing, according to a result of comparison of angles of view of a main captured image generated by a main imaging section and a subordinate captured image generated by a subordinate imaging section, an image synthesis process with use of the main captured image and the subordinate captured image, and a step of performing the image synthesis process in response to detection of an action of visually recognizing the display image.

It should be noted that the program of the present technology can be, for example, provided to a general-purpose computer capable of executing various program codes by using a storage medium or a communication medium that provides the program in a computer-readable manner which is, for example, a storage medium such as an optical disc, a magnetic disk, or a semiconductor memory or a communication medium such as a network. A process according to the program is realized on the computer as a result of the provision of such a program in a computer-readable manner.

A fourth aspect of the present technology is an imaging apparatus that includes a main imaging section adapted to generate a main captured image, a subordinate imaging section adapted to generate a subordinate captured image in an imaging direction corresponding to an imaging direction of the main imaging section, a control section adapted to compare angles of view of the main captured image and the subordinate captured image, an image synthesis section adapted to generate a display image by performing an image synthesis process with use of the main captured image and the subordinate captured image, according to a result of comparison of the angles of view performed by the control section, a display section adapted to display the display image generated by the image synthesis section, and a detection section adapted to detect an action of visually recognizing the image. The control section causes the image synthesis section to perform the image synthesis process in response to detection, by the detection section, of the action of visually recognizing the display image generated by the image synthesis section.

In the present technology, the main imaging section generates a main captured image, and the subordinate imaging section generates a subordinate captured image in the imaging direction corresponding to the imaging direction of the main imaging section. Also, the control section compares the angles of view of the main captured image and the subordinate captured image, and the image synthesis section generates the display image by performing, according to a result of comparison of the angles of view performed by the control section, an image synthesis process using the main captured image and the subordinate captured image in which, for example, one of the main captured image and the subordinate captured image is superimposed on the other of the two images. The display image is displayed on the display section. Also, the control section causes the image synthesis section to perform the image synthesis process in response to the detection, by the detection section, of the action of visually recognizing the display image generated by the image synthesis section. A plurality of the display sections are provided, and the display section for displaying the display image is switched in response to an image confirmation action of the user. For example, one of the display sections is a viewfinder, and when the user performs an action of visually recognizing the viewfinder image, the display image is displayed on the viewfinder. Also, a touch panel provided on a screen of the display section as a user interface section for accepting a user operation is used, and the control section controls the image synthesis section to change the superimposition size or the superimposition position in the image synthesis process in response to the user operation accepted by the user interface section.

The subordinate imaging section may be provided in a manner so as to be fastened to a body section having the main imaging section. Alternatively, the subordinate imaging section may be provided in a manner so as to be attachable to and detachable from a body section having the main imaging section. Also, the subordinate imaging section is electrically connected to the body section by a connection terminal or a connection cable or through wireless communication. Also, a plurality of the subordinate imaging sections may be provided, and the imaging directions of the plurality of subordinate imaging sections point outward relative to the imaging direction of the main imaging section.

BRIEF DESCRIPTION OF DRAWINGS

FIGS. 2A and 2B depict diagrams illustrating a second example of the structure of the imaging apparatus.

FIGS. 3A and 3B depict diagrams illustrating a third example of the structure of the imaging apparatus.

FIGS. 4A and 4B depict diagrams illustrating a fourth example of the structure of the imaging apparatus.

FIG. 8 is a flowchart illustrating another captured image display action.

FIGS. 9A and 9B depict diagrams illustrating a case where a superimposition position of a subordinate captured image Ps is changed in response to a swiping operation.

FIGS. 10A and 10B depict diagrams illustrating a case where a main captured image Pm is enlarged in response to a pinch-out operation.

DESCRIPTION OF EMBODIMENT

Figures 1A, 1B:
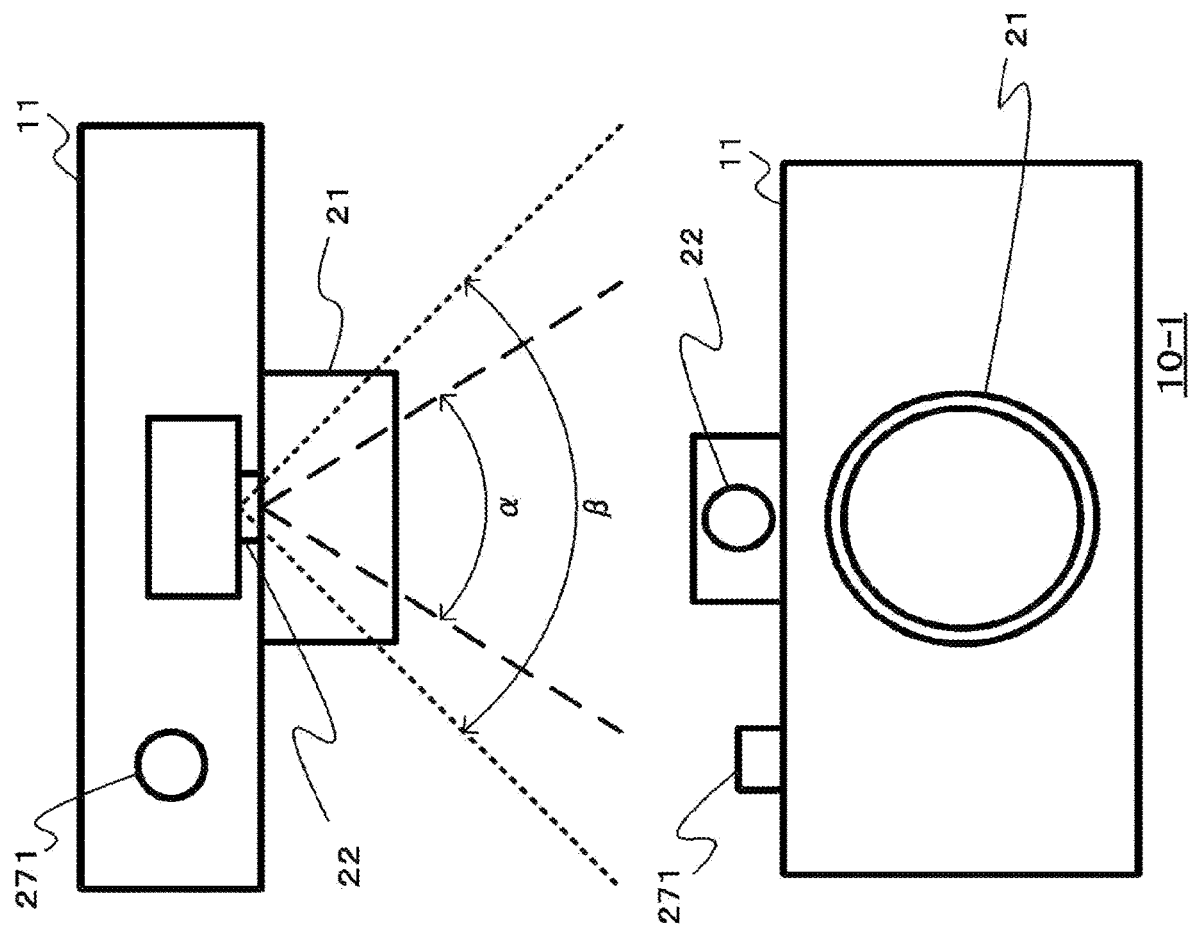
FIGS. 1A and 1B depict diagrams illustrating a first example of a structure of an imaging apparatus.

A description will be given below of a mode for carrying out the present technology. It should be noted that the description will be given in the following order.

1. Imaging apparatus
2. Example of structure of the imaging apparatus
3. Functional configuration and action of the imaging apparatus
4. Another functional configuration and action of the imaging apparatus
5. Another display image generation action of the imaging apparatus 1. Imaging Apparatus An imaging apparatus using an image processing apparatus of the present technology includes a main imaging section, a subordinate imaging section, an image synthesis section, a display section, and a control section. The main imaging section generates a main captured image, and the subordinate imaging section generates a subordinate captured image. The image synthesis section generates a display image by performing, according to a result of comparison of angles of view of the main captured image and the subordinate captured image in the control section, an image synthesis process of synthesizing the main captured image and the subordinate captured image. The display section displays the display image generated by the image synthesis section.

2. Example of Structure of the Imaging Apparatus

FIGS. 1A and 1B depict a first example of a structure of the imaging apparatus. FIG. 1A depicts a front view, and FIG. 1B depicts a top view. An imaging apparatus 10-1 has a main imaging section 21 on a body section 11 and a subordinate imaging section 22 for setting a composition or for other purposes, at, for example, an upper center area of the body section 11. Directions of optical axes (imaging directions) of the main imaging section 21 and the subordinate imaging section 22 are set to run parallel to each other. An angle of view β of the subordinate imaging section 22 is wider than an angle of view α of the main imaging section 21. Also, in a case where a zoom lens is used on the main imaging section 21, the angle of view β of the subordinate imaging section 22 is set in such a manner that an angle-of-view adjustment range includes a range of angle of view narrower than the angle of view of the subordinate imaging section 22. It should be noted that a shutter button 271 is provided on a top surface of the body section 11.

FIGS. 2A and 2B depict a second example of the structure of the imaging apparatus. FIG. 2A depicts the front view, and FIG. 2B depicts the top view. An imaging apparatus 10-2 has the main imaging section 21 on the body section 11 and an attachment 12 at, for example, the upper center area of the body section 11. The subordinate imaging section 22 can be fitted to the attachment 12, and, when the subordinate imaging section 22 is fitted to the attachment 12, the subordinate imaging section 22 is electrically connected to the body section 11, thus allowing power to be supplied to the subordinate imaging section 22 from the body section 11 and an image signal to be supplied to the body section 11 from the subordinate imaging section 22. The directions of the optical axes (imaging directions) of the main imaging section 21 and the subordinate imaging section 22 fitted to the attachment 12 are set to run parallel to each other. The angle of view β of the subordinate imaging section 22 is wider than the angle of view α of the main imaging section 21. Also, in the case where the zoom lens is used on the main imaging section 21, the angle of view β of the subordinate imaging section 22 is set in such a manner that the angle-of-view adjustment range includes the range of angle of view narrower than the angle of view of the subordinate imaging section 22. It should be noted that the shutter button 271 is provided on the top surface of the body section 11.

FIG. depicts a third example of the structure of the imaging apparatus. FIG. 3A depicts the front view, and FIG. 3B depicts the top view. An imaging apparatus 10-3 has the main imaging section 21 on the body section 11 and a mounting space SP for the subordinate imaging section 22, for example, at an upper area on a front surface of the body section 11. The subordinate imaging section 22 is attachable to and detachable from the mounting space SP and may be connected to the body section 11 by using a connection cable 14 or via a wireless transmission channel. The directions of the optical axes (imaging directions) of the main imaging section 21 and the subordinate imaging section 22 provided on the mounting space SP are set to run parallel to each other. The angle of view β of the subordinate imaging section 22 is wider than the angle of view a of the main imaging section 21. Also, in the case where the zoom lens is used on the main imaging section 21, the angle of view β of the subordinate imaging section 22 is set in such a manner that the angle-of-view adjustment range includes the range of angle of view narrower than the angle of view of the subordinate imaging section 22. It should be noted that the shutter button 271 is provided on the top surface of the body section 11.

FIGS. 4A and 4B depict a fourth example of the structure of the imaging apparatus. FIG. 4A depicts the front view, and FIG. 4B depicts the top view. An imaging apparatus 10-4 has the main imaging section 21 on the body section 11 and the subordinate imaging section 22 and a subordinate imaging section 23 on, for example, the front surface of the body section 11. The directions of the optical axes (imaging directions) of the subordinate imaging sections 22 and 23 may be set to run parallel to the main imaging section 21. Alternatively, as illustrated in FIG. 4B, the directions of the optical axes of the subordinate imaging sections 22 and 23 may each point outward relative to the direction of the optical axis of the main imaging section 21. If the subordinate imaging sections 22 and 23 are provided in such a manner as to point outward as described above, it is possible to prevent vignetting in the captured images generated by the subordinate imaging sections 22 and 23, vignetting being caused by, for example, the lens of the main imaging section 21. Also, if a subordinate captured image Ps is generated by synthesizing the captured images acquired by the subordinate imaging section 22 and the subordinate imaging section 23, the angle of view β of the subordinate captured image Ps is wider than an angle of view β1 of the subordinate imaging section 22 and an angle of view β2 of the subordinate imaging section 23. The angle of view β is wider than the angle of view α of the main imaging section 21. Also, in the case where the zoom lens is used on the main imaging section 21, the angles of view β1 and β2 and the imaging directions of the subordinate imaging sections 22 and 23 are set in such a manner that the angle-of-view adjustment range includes the range of angle of view narrower than the angle of view β. It should be noted that the shutter button 271 is provided on the top surface of the body section 11.

3. Functional Configuration and Action of the Imaging Apparatus

Figure 5:
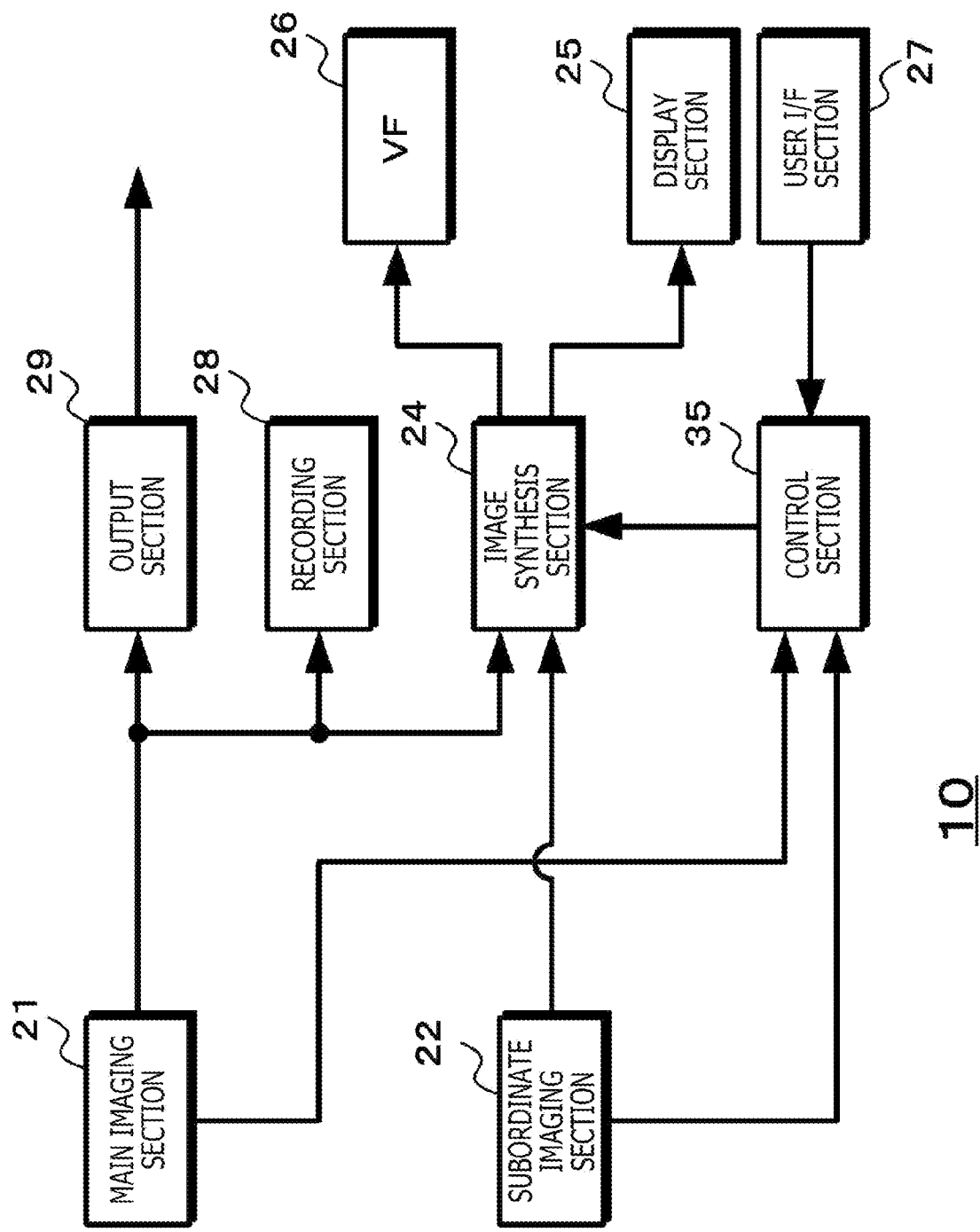
FIG. 5 is a diagram illustrating a functional configuration of the imaging apparatus.

FIG. 5 illustrates a functional configuration of the imaging apparatus using the image processing apparatus of the present technology. It should be noted that, in the description given below, a case where the imaging apparatus has the main imaging section 21 and the subordinate imaging section 22 illustrated, for example, in FIGS. 1A, 1B, 2A, 2B, 3A, and 3B as the plurality of imaging sections having different angles of view will be described.

An imaging apparatus 10 includes the main imaging section 21, the subordinate imaging section 22, an image synthesis section 24, a display section 25, a viewfinder (VF) 26, a user interface (user I/F) section 27, and a control section 35. Also, the imaging apparatus 10 may include a recording section 28 and an output section 29.

The main imaging section 21 has, for example, an imaging optics block, an image sensor, a camera signal processing section, and the like. The imaging optics block includes a focus lens, the zoom lens, an iris mechanism, and the like and forms an optical image of a subject at a desired size on an imaging surface of the image sensor. A CMOS (Complementary Metal Oxide Semiconductor), a CCD (Charge Coupled Device), or the like is used as the image sensor. The image sensor generates an image signal corresponding to the subject optical image through photoelectric conversion. A camera signal processing section generates a main captured image Pm by performing, on a pixel signal generated by the image sensor, a noise removal process, a gain adjustment process, an analog/digital conversion process, a defective pixel correction, a development process, and the like, and outputs the main captured image Pm to the image synthesis section 24, the recording section 28, and the output section 29.

The subordinate imaging section 22 has the imaging optics block, the image sensor, the camera signal processing section, and the like as does the main imaging section 21. Also, the angle of view of the imaging optics block of the subordinate imaging section 22 is, for example, wider than the angle of view of the imaging optics block of the main imaging section 21. The subordinate imaging section 22 generates the subordinate captured image Ps and outputs the image to the image synthesis section 24. Also, in a case where the zoom lens is used as the imaging optics block of the main imaging section 21, the angle of view of the imaging optics block of the subordinate imaging section 22 is set in such a manner that the angle-of-view adjustment range includes the range of angle of view narrower than the angle of view of the subordinate imaging section 22.

The image synthesis section 24 generates a display image Pd by performing, on the basis of a control signal from the control section 35, the image synthesis process of synthesizing the main captured image Pm generated by the main imaging section 21 and the subordinate captured image Ps generated by the subordinate imaging section 22. Also, the image synthesis section 24 outputs the image signal of the generated display image Pd to the display section 25 or the viewfinder 26 or to both the display section 25 and the viewfinder 26. Further, the image synthesis section 24 may output the image signal of the display image Pd to either the display section 25 or the viewfinder 26, on the basis of the control signal from the control section 35.

The display section 25 includes a liquid crystal display element, an organic EL display element, or the like. The display section 25 displays the display image Pd supplied from the image synthesis section 24. Also, the display section 25 displays a menu of the imaging apparatus 10, a GUI related to user (e.g., photographer) operations, and the like, on the basis of the control signal from the control section 35.

The viewfinder 26 includes the liquid crystal display element, the organic EL display element, or the like. The viewfinder 26 displays the captured image on the basis of a display image signal supplied from the image synthesis section 24.

The user interface section 27 includes the shutter button 271, an operation switch, an operation button, and the like. The user interface section 27 generates an operation signal corresponding to the user operation and outputs the operation signal to the control section 35. Also, the user interface section 27 may have a detection section for detecting the visual recognition of the display of the viewfinder 26, such as an ocular detection section for detecting whether the user is looking into the viewfinder 26, and output a signal, as the operation signal, indicating a detection result to the control section 35.

The recording section 28 includes a recording medium fastened to the imaging apparatus 10 or a recording medium attachable to and detachable from the imaging apparatus 10. The recording section 28 records, in the recording medium, a captured image signal generated by the main imaging section 21, on the basis of the control signal from the control section 35.

The control section 35 includes a CPU (Central Processing Unit), a ROM (Read Only Memory), a RAM (Random Access Memory), and the like. The ROM (Read Only Memory) stores a variety of programs executed by the CPU (Central Processing Unit). The RAM (Random Access Memory) stores information such as a variety of parameters. By executing the variety of programs stored in the ROM, the CPU controls different sections on the basis of the operation signal from the user interface section 27 in such a manner that the imaging apparatus 10 performs the action corresponding to the user operation. Also, the control section 35 controls the image synthesis process of the image synthesis section 24 by comparing the angle of view of the main imaging section 21 (main captured image Pm) and the angle of view of the subordinate imaging section 22 (subordinate captured image Ps) and outputting the control signal indicating the comparison result to the image synthesis section. Further, the control section 35 outputs the control signal indicating a new result of comparison of the angles of view because the angle of view of the captured image changes in a case where the main imaging section 21 or the subordinate imaging section 22 performs a zooming action. Also, the control section 35 may control the image synthesis section 24 to perform the image synthesis process on the basis of the operation signal from the user interface section 27 in a case where the visual recognition of the display of the viewfinder 26 is detected.

Figure 6:
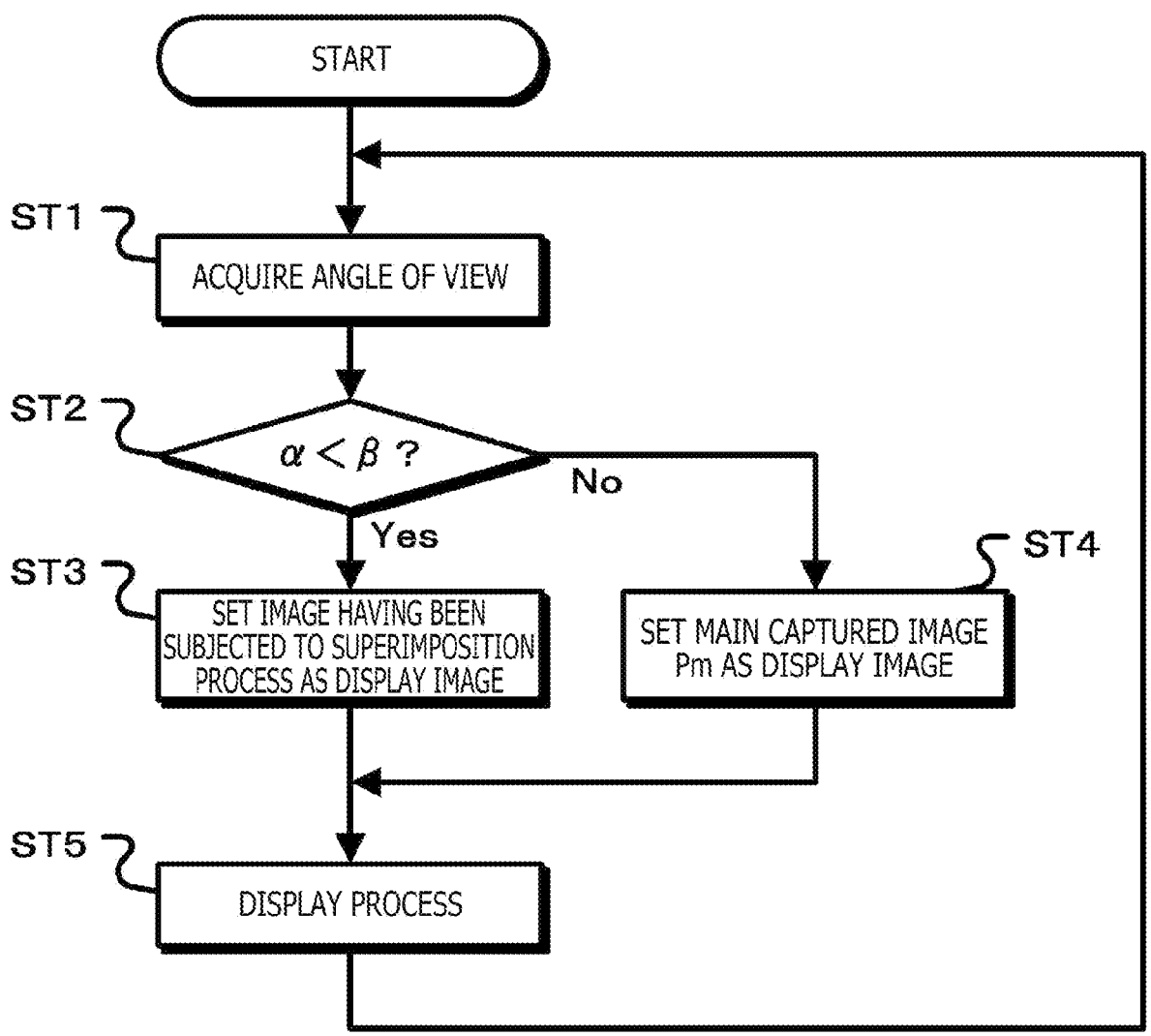
FIG. 6 is a flowchart illustrating a captured image display action.

FIG. 6 is a flowchart illustrating a captured image display action of the imaging apparatus. In step ST1, the control section acquires the angles of view of the imaging sections. The control section 35 acquires the angle of view $\alpha$ of the main imaging section 21 (main captured image Pm) and the angle of view $\beta$ of the subordinate imaging section 22 (subordinate captured image Ps). For example, in a case where imaging lenses used on the main imaging section 21 and the subordinate imaging section 22 have a fixed focus and are not interchangeable, angle-of-view information indicating the angle of view $\alpha$ of the main imaging section 21 and the angle of view $\beta$ of the subordinate imaging section 22 is stored in advance in the control section 35 in a manufacturing process of the imaging apparatus or the like. Also, for example, in a case where the imaging lens of the main imaging section 21 is the zoom lens or the interchangeable lens, the angle of view $\alpha$ may be acquired from the imaging lens, or the angle of view $\alpha$ corresponding to the zooming operation may be calculated by the control section 35. The control section 35 acquires the angles of view $\alpha$ and $\beta$ and proceeds to step ST2.

In ST2, the control section determines whether the angle of view $\alpha$ is narrower than the angle of view $\beta$. The control section 35 proceeds to step ST3 in a case where the angle of view $\alpha$ is narrower than the angle of view $\beta$ and proceeds to step ST4 in a case where the angle of view $\alpha$ is equal to or wider than the angle of view $\beta$.

In step ST3, the control section sets the image that has been subjected to a superimposition process as the display image. The control section 35 controls the image synthesis section 24 to superimpose the main captured image Pm generated by the main imaging section 21 on the subordinate captured image Ps generated by the subordinate imaging section 22 or to reduce the subordinate captured image Ps generated by the subordinate imaging section 22 and superimpose the reduced subordinate captured image Ps on the main captured image Pm generated by the main imaging section 21, sets the image that has been subjected to the superimposition process as the display image Pd, and proceeds to step ST5.

In step ST4, the control section sets the main captured image Pm as the display image. The control section 35 controls the image synthesis section 24 to set the main captured image Pm generated by the main imaging section 21 as the display image Pd and proceeds to step ST5.

In step ST5, the control section performs a display process. The control section 35 causes, for example, the viewfinder 26 to display the display image Pd set in step ST3 or step ST4 and returns to step ST1.

As described above, according to the present technology, in the case where the angle of view of the subordinate imaging section is wider than the angle of view of the main imaging section, the display image is generated by using the main captured image Pm and the subordinate captured image Ps, thus making it possible for the user to easily conduct shooting with an optimal composition by using the subordinate captured image Ps while at the same time confirming the main captured image Pm.

4. Another Functional Configuration and Action of the Imaging Apparatus

Incidentally, the display image generation action described above may be performed as necessary. Alternatively, the image synthesis process may be performed in such a manner as to acquire the display image desired by the user.

Figure 7:
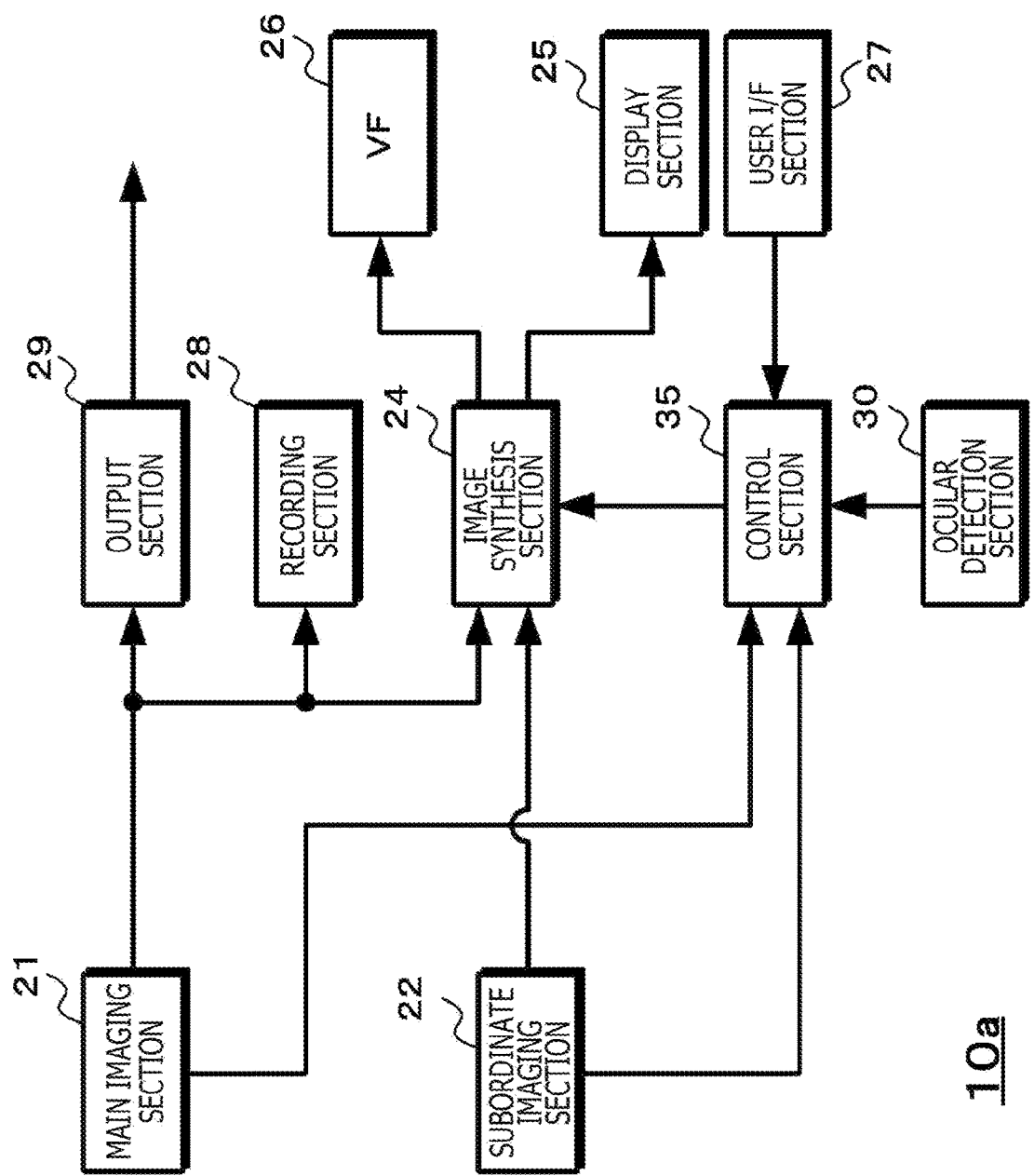
FIG. 7 is a diagram illustrating another functional configuration of the imaging apparatus.

FIG. 7 illustrates another functional configuration of the imaging apparatus using the present technology. It should be noted that, in the description given below, the case where the imaging apparatus has the main imaging section 21 and the subordinate imaging section 22 illustrated, for example, in FIGS. 1A, 1B 2A, 2B, 3A, and 3B, as the plurality of imaging sections having different angles of view will be described.

The imaging apparatus 10 includes the main imaging section 21, the subordinate imaging section 22, the image synthesis section 24, the display section 25, the viewfinder 26, the user interface section 27, an ocular detection section 30, and the control section 35. Also, the imaging apparatus 10 may include the recording section 28, the output section 29, and the like.

The main imaging section 21 includes the imaging lens, the image sensor, the camera signal processing section, and the like, generates the main captured image Pm, and outputs the generated main captured image Pm to the image synthesis section 24 and the recording section 28. Also, the main imaging section 21 may externally output the generated main captured image Pm.

The subordinate imaging section 22 includes the imaging lens having a wider angle of view than the main imaging section 21, the image sensor, the camera signal processing section, and the like, generates the subordinate captured image Ps, and outputs the generated subordinate captured image Ps to the image synthesis section 24. Also, in the case where the zoom lens is used as the imaging lens of the main imaging section 21, the angle of view of the imaging lens of the subordinate imaging section 22 is set in such a manner that the angle-of-view adjustment range includes the range of angle of view narrower than the angle of view of the subordinate imaging section 22.

The image synthesis section 24 generates the display image Pd by performing, on the basis of the control signal from the control section 35, the image synthesis process of synthesizing the main captured image Pm generated by the main imaging section 21 and the subordinate captured image Ps generated by the subordinate imaging section 22. Also, the image synthesis section 24 outputs the image signal of the generated display image Pd to the display section 25 or the viewfinder 26 or to both the display section 25 and the viewfinder 26. Further, the image synthesis section 24 may output the image signal of the display image Pd to either the display section 25 or the viewfinder 26, on the basis of the control signal from the control section 35.

The display section 25 includes the liquid crystal display element, the organic EL display element, or the like. The display section 25 displays the display image Pd supplied from the image synthesis section 24. Also, the display section 25 displays the menu of the imaging apparatus 10, the GUI related to user operations, and the like, on the basis of the control signal from the control section 35.

The viewfinder 26 includes the liquid crystal display element, the organic EL display element, or the like. The viewfinder 26 displays the captured image on the basis of the display image signal supplied from the image synthesis section 24.

The user interface section 27 uses the shutter button 271, the operation switch, the operation button, the GUI that includes the touch panel on the screen of the display section 25, and the like. The user interface section 27 generates the operation signal corresponding to the user operation and outputs the signal to the control section 35.

The ocular detection section 30 detects, for example, whether the user is looking into the viewfinder 26 by detecting the user action of visually recognizing the image and outputs an ocular detection result to the control section 35.

The recording section 28 includes the recording medium fastened to the imaging apparatus 10 or the recording medium attachable to and detachable from the imaging apparatus 10. The recording section 28 records, in the recording medium, the captured image signal generated by the main imaging section 21, on the basis of the control signal from the control section 35.

The control section 35 includes the CPU (Central Processing Unit), the ROM (Read Only Memory), the RAM (Random Access Memory), and the like. The ROM (Read Only Memory) stores the variety of programs executed by the CPU (Central Processing Unit). The RAM (Random Access Memory) stores information such as the variety of parameters. By executing the variety of programs stored in the ROM, the CPU controls the different sections on the basis of the operation signal from the user interface section 27 in such a manner that the imaging apparatus 10 performs the action corresponding to the user operation. Also, the control section 35 controls the image synthesis process of the image synthesis section 24 by comparing the angle of view of the main imaging section 21 (main captured image Pm) and the angle of view of the subordinate imaging section 22 (subordinate captured image Ps) and outputting the control signal indicating the comparison result to the image synthesis section. Also, the control section 35 outputs the control signal indicating a new result of comparison between the angles of view because the angle of view of the captured image changes in the case where the main imaging section 21 or the subordinate imaging section 22 performs the zooming action. Also, the control section 35 causes the image synthesis section to perform the image synthesis process, on the basis of the detection result of the ocular detection section 30, in response to the detection of the action of visually recognizing the display image generated by the image synthesis section 24. Further, the control section 35 controls the action of displaying the display image Pd, on the basis of the detection result of the ocular detection section 30.

FIG. 8 is a flowchart illustrating another captured image display action of the imaging apparatus. In step ST11, the control section 35 acquires the ocular detection result. The control section 35 acquires the ocular detection result from the ocular detection section 30 and proceeds to step ST12.

In step ST12, the control section 35 selects a display medium. In a case where the control section 35 determines, on the basis of the detection result acquired in step ST11, that the user is looking into the viewfinder 26, the control section 35 selects the viewfinder 26 as the display medium, and in a case where the control section 35 determines that the user is not looking into the viewfinder 26, the control section 35 selects the display section 25 as the display medium and proceeds to step ST13.

In step ST13, the control section acquires the angles of view. The control section 35 acquires the angle of view $\alpha$ of the main imaging section 21 (main captured image Pm) and the angle of view $\beta$ of the subordinate imaging section 22 (subordinate captured image Ps). For example, in the case where imaging lenses used on the main imaging section 21 and the subordinate imaging section 22 have a fixed focus and are not interchangeable, angle-of-view information indicating the angle of view $\alpha$ of the main imaging section 21 and the angle of view $\beta$ of the subordinate imaging section 22 is stored in advance in the control section 35 in the manufacturing process of the imaging apparatus or the like. Also, for example, in the case where the imaging lens of the main imaging section 21 is the zoom lens or the interchangeable lens, the angle of view $\alpha$ may be acquired from the imaging lens, or the angle of view $\alpha$ corresponding to the zooming operation may be calculated by the control section 35. The control section 35 acquires the angles of view $\alpha$ and $\beta$ and proceeds to step ST14.

In step ST14, the control section determines whether the angle of view $\alpha$ is narrower than the angle of view $\beta$. The control section 35 proceeds to step ST15 in a case where the control section 35 determines that the angle of view $\alpha$ is narrower than the angle of view $\beta$ and proceeds to step ST18 in the case where the angle of view $\alpha$ is equal to or wider than the angle of view $\beta$.

In step ST15, the control section sets the image that has been subjected to the superimposition process as the display image. The control section 35 controls the image synthesis section 24 to superimpose the main captured image Pm generated by the main imaging section 21 on the subordinate captured image Ps generated by the subordinate imaging section 22 or to reduce the subordinate captured image Ps generated by the subordinate imaging section 22 and superimpose the reduced subordinate captured image Ps on the main captured image Pm generated by the main imaging section 21, sets the image that has been subjected to the superimposition process as the display image Pd, and proceeds to step ST16.

In step ST16, the control section determines whether an updating operation has been performed. The control section 35 proceeds to step ST17 in a case where the control section 35 determines that the user interface section 27 has performed the updating operation of the image synthesis process and proceeds to step ST19 in a case where the control section 35 does not determine that the user interface section 27 has performed the updating operation.

In step ST17, the control section performs an image synthesis updating processes. The control section 35 generates, on the basis of the operation signal from the user interface section 27, the display image Pd by changing the superimposition size or the superimposition position of the main captured image Pm to be superimposed on the subordinate captured image Ps or the subordinate captured image Ps to be superimposed on the main captured image Pm and proceeds to step ST19.

FIGS. 9A and 9B depict diagrams illustrating a case where the superimposition position of the subordinate captured image Ps is changed in response to a swiping operation. FIG. 9A depicts the display image displayed on the viewfinder 26. Also, FIG. 9B depicts the swiping operation performed by using the touch panel of the user interface section 27 provided on the screen of the display section 25. In a case where the user touches the touch panel and slides his or her fingertip upward, the superimposition position of the main captured image Pm moves upward to a position Qv indicated by a dashed line.

FIGS. 10A and 10B illustrate a case where the main captured image Pm is enlarged in response to a pinch-out operation. FIG. 10A depicts the display image Pd displayed on the viewfinder 26. Also, FIG. 10B depicts the pinch-out operation performed by using the touch panel of the user interface section 27 provided on the screen of the display section 25. In a case where the user widens a gap between two fingers that are touching the touch panel diagonally on the screen, the main captured image Pm is enlarged vertically and horizontally.

Referring back to FIG. 8, the control section sets the main captured image Pm as the display image in step ST18. The control section 35 controls the image synthesis section 24 to set the main captured image Pm generated by the main imaging section 21 as the display image Pd and proceeds to step ST19.

In step ST19, the control section performs the display process. The control section 35 causes the display image Pd to be displayed by using the display medium selected in step ST12 and returns to step ST11.

As described above, in the case where the angle of view of the main imaging section is wider than the angle of view of the subordinate imaging section, the main captured image Pm generated by the main imaging section is superimposed on the subordinate captured image Ps generated by the subordinate imaging section, thus making it possible to conduct shooting with the optimal composition by using the subordinate captured image Ps while at the same time confirming the main captured image Pm. Also, it is possible to display the display image on the display medium used by the user. Further, in the case where the main captured image Pm is superimposed on the subordinate captured image Ps, it is possible to change the display size or the superimposition position of the main captured image Pm, thus making it easy to perform an operation using the display image.

5. Another Display Image Generation Action of the Imaging Apparatus

Although the display image is generated by superimposing the main captured image Pm on the subordinate captured image Ps in the imaging apparatus described above, a captured image frame indicating a region captured by the main imaging section 21 may be superimposed on the subordinate captured image Ps. In this case, in a case where the user interface section 27 performs a resizing operation of the captured image frame, the zoom lens may be driven in such a manner that the captured image in the resized captured image frame is generated by the main imaging section 21.

Also, in the case where the plurality of subordinate imaging sections are provided as illustrated in FIGS. 4A and 4B, the image synthesis section 24 generates the subordinate captured image Ps having a wide angle of view by synthesizing the captured images generated by the plurality of subordinate imaging sections. As described above, it is possible, by providing the plurality of subordinate imaging sections, to widen the angle of view as compared to a case where the subordinate captured image Ps is generated by the single subordinate imaging section. Further, it is possible, by tilting the optical axes of the plurality of subordinate imaging sections outward, to further widen the angle of view of the subordinate captured image Ps generated by synthesizing the captured images. Also, even if vignetting caused by the main imaging section occurs in the captured image generated by any one of the subordinate imaging sections, the subject region affected by this vignetting can be imaged by another subordinate imaging section, thus making it possible to generate the subordinate captured image Ps free of vignetting caused by the main imaging section.

A series of processes described in the specification can be performed by hardware alone, software alone, or a combination thereof. In a case where the processes are performed by software, a program having a processing sequence recorded therein is installed on a memory in the computer incorporated in dedicated hardware for execution. Alternatively, the program can be installed on a general-purpose computer capable of performing various processes for execution.

For example, the program can be recorded in advance in a hard disk, an SSD (Solid State Drive), or the ROM (Read Only Memory) as the recording medium. Alternatively, the program can be stored (recorded) temporarily or permanently in a removable recording medium such as a flexible disk, a CD-ROM (Compact Disc Read Only Memory), an MO (Magneto optical) disk, a DVD (Digital Versatile Disc), a BD (Blu-Ray Disk (registered trademark)), a magnetic disk, or a semiconductor memory. Such a removable recording medium can be supplied as what is called package software.

Also, the program may be not only installed on the computer from the removable recording medium but also transmitted to the computer in a wireless or wired manner via a network such as a LAN (Local Area Network) or the Internet from a download site. The computer can receive the program transmitted in such a manner and install the program on the built-in recording medium such as a hard disk.

It should be noted that an advantageous effect described in the present specification is merely illustrative and not restrictive, and there may be additional advantageous effects that are not described therein. Also, the present technology should not be construed as being limited to the embodiment of the technology described above. This embodiment of the technology discloses the present technology in the form of illustration, and it is apparent that a person skilled in the art can modify or substitute for the embodiment without departing from the gist of the present technology. That is, in order to determine the gist of the present technology, the claims should be taken into account.

Also, the image processing apparatus of the present technology can also have the following configurations.

(1)

An image processing apparatus including:

an image synthesis section adapted to generate a display image by performing, according to a result of comparison of angles of view of a main captured image generated by a main imaging section and a subordinate captured image generated by a subordinate imaging section, an image synthesis process with use of at least either the main captured image or the subordinate captured image; and a control section adapted to cause the image synthesis section to perform the image synthesis process in response to detection of an action of visually recognizing the display image generated by the image synthesis section.

(2)

The image processing apparatus of feature (1), in which an angle of view of the main imaging section or the subordinate imaging section is able to be changed.

(3)

The image processing apparatus of feature (1) or (2), further including:

a control section adapted to compare the angles of view of the main captured image and the subordinate captured image, on the basis of angle-of-view information indicating the angles of view of the main captured image and the subordinate captured image, and output a result of the comparison to the image synthesis section.

(4)

The image processing apparatus of feature (3), in which, in a case where the main imaging section or the subordinate imaging section performs a zooming action, the control section outputs the result of comparison of the angles of view of the main captured image and the subordinate captured image to the image synthesis section.

(5)

The image processing apparatus of any one of features (1) to (4), in which, in a case where the angle of view of the main captured image is narrower than the angle of view of the subordinate captured image, the image synthesis section generates the display image by performing the image synthesis process with use of the main captured image and the subordinate captured image.

(6)

The image processing apparatus of feature (5), in which the image synthesis section generates the display image by superimposing the main captured image on the subordinate captured image.

(7)

The image processing apparatus of feature (5), in which the image synthesis section generates the display image by superimposing the reduced subordinate captured image on the main captured image.

(8)

The image processing apparatus of feature (5), further including:

a user interface section adapted to accept a user operation, in which the image synthesis section changes a superimposition size or a superimposition position in response to the user operation accepted by the user interface section.

(9)

The image processing apparatus of any one of features (1) to (8), in which, in a case where the angle of view of the main captured image is equal to or wider than the angle of view of the subordinate captured image, the image synthesis section sets the main captured image as the display image.

(10)

The image processing apparatus of any one of features (1) to (9), in which the subordinate captured image is an image generated by the subordinate imaging section in an imaging direction corresponding to an imaging direction of the main imaging section.

REFERENCE SIGNS LIST

10, 10-1, 10-2, 10-3, 10-4: Imaging apparatus
11: Body section

12: Attachment
21: Main imaging section
22, 23: Subordinate imaging section
24: Image synthesis section
25: Display section
26: Viewfinder
27: User interface section
28: Recording section
29: Output section
30: Ocular detection section
35: Control section

The invention claimed is:

1. An image processing apparatus, comprising:
an image synthesis section configured to generate, based on a result of comparison of a first angle of view of a main captured image generated by a main imaging section and a second angle of view of a subordinate captured image generated by a subordinate imaging section, a display image by an image synthesis process with use of the main captured image and the subordinate captured image; and
a control section configured to control the image synthesis section to perform the image synthesis process in response to detection of an action of visual recognition of the display image generated by the image synthesis section.

2. The image processing apparatus according to claim 1, wherein
the first angle of view of the main imaging section or the second angle of view of the subordinate imaging section is changeable.

3. The image processing apparatus according to claim 1, wherein the control section is further configured to:
compare, based on angle-of-view information indicating the first angle of view of the main captured image and the second angle of view of the subordinate captured image, the first angle of view of the main captured image and the second angle of view of the subordinate captured image; and
output the result of the comparison to the image synthesis section.

4. The image processing apparatus according to claim 3, wherein,
in a case where the main imaging section or the subordinate imaging section performs a zooming action, the control section is further configured to output the result of the comparison of the first angle of view of the main captured image and the second angle of view of the subordinate captured image to the image synthesis section.

5. The image processing apparatus according to claim 1, wherein,
in a case where the first angle of view of the main captured image is narrower than the second angle of view of the subordinate captured image, the image synthesis section is further configured to generate the display image by the image synthesis process with use of the main captured image and the subordinate captured image.

6. The image processing apparatus according to claim 5, wherein
the image synthesis section is further configured to generate the display image by superimposition of the main captured image on the subordinate captured image.

7. The image processing apparatus according to claim 5, wherein
the image synthesis section is further configured to:
reduce the subordinate captured image; and
generate the display image by superimposition of the reduced subordinate captured image on the main captured image.

8. The image processing apparatus according to claim 5, further comprising:
a user interface section configured to accept a user operation, wherein
the image synthesis section is further configured to change a superimposition size or a superimposition position in response to the user operation accepted by the user interface section.

9. The image processing apparatus according to claim 1, wherein,
in a case where the first angle of view of the main captured image is equal to or wider than the second angle of view of the subordinate captured image, the image synthesis section is further configured to set the main captured image as the display image.

10. The image processing apparatus according to claim 1, wherein
the subordinate captured image is an image generated by the subordinate imaging section in an imaging direction corresponding to an imaging direction of the main imaging section.

11. An image processing method, comprising:
generating, by an image synthesis section, based on a result of comparison of a first angle of view of a main captured image generated by a main imaging section and a second angle of view of a subordinate captured image generated by a subordinate imaging section, a display image by an image synthesis process with use of the main captured image and the subordinate captured image; and
controlling, by a control section, the image synthesis section to perform the image synthesis process in response to detection of an action of visually recognizing the display image generated by the image synthesis section.

12. A non-transitory computer-readable medium having stored thereon, computer-executable instructions which, when executed by a computer, cause the computer to execute operations, the operations comprising:
generating, based on a result of comparison of a first angle of view of a main captured image generated by a main imaging section and a second angle of view of a subordinate captured image generated by a subordinate imaging section, a display image by an image synthesis process with use of the main captured image and the subordinate captured image; and
performing the image synthesis process in response to detection of an action of visually recognizing the generated display image.

13. An imaging apparatus, comprising:
a main imaging section configured to generate a main captured image;
a subordinate imaging section configured to generate a subordinate captured image in an imaging direction corresponding to an imaging direction of the main imaging section;
a control section configured to compare a first angle of view of the main captured image and a second angle of view of the subordinate captured image;
an image synthesis section configured to generate, based on a result of the comparison, a display image by an image synthesis process with use of the main captured image and the subordinate captured image;

a display section configured to display the display image generated by the image synthesis section; and a detection section configured to detect an action of visual recognition of the generated display image, wherein the control section is further configured to control the image synthesis section to perform the image synthesis process in response to the detection.

14. The imaging apparatus according to claim 13, wherein the display section comprises a plurality of display sections, and the control section switches, based on a detection result of the detection section, the display section for display of the display image.

15. The imaging apparatus according to claim 14, wherein one of the plurality of display sections is a viewfinder, and, when a user performs the action of visual recognition of a viewfinder image, the display image is displayed on the viewfinder.

16. The imaging apparatus according to claim 13, further comprising:

a user interface section configured to accept a user operation, wherein the image synthesis section is further configured to perform the image synthesis process of superimposition superimposing one of the main captured image and the subordinate captured image, and the control section is further configured to control the image synthesis section to change a superimposition size or a superimposition position in the image synthesis process in response to the user operation accepted by the user interface section.

17. The imaging apparatus according to claim 16, wherein the display section comprises a plurality of display sections, and the user interface section is a touch panel on a display screen of any one of the plurality of display sections.

18. The imaging apparatus according to claim 13, wherein the subordinate imaging section is in a manner so as to be fastened to a body section having the main imaging section.

19. The imaging apparatus according to claim 13, wherein the subordinate imaging section is in a manner so as to be attachable to and detachable from a body section having the main imaging section.

20. The imaging apparatus according to claim 13, wherein the subordinate imaging section is electrically connected to a body section having the main imaging section by a connection terminal or a connection cable or through wireless communication.

21. The imaging apparatus according to claim 13, wherein the subordinate imaging section comprises a plurality of subordinate imaging sections, and imaging directions of the plurality of subordinate imaging sections point outward relative to the imaging direction of the main imaging section.

* * * * *